United States Patent [19]
Bren et al.

[11] Patent Number: 5,825,850
[45] Date of Patent: Oct. 20, 1998

[54] AUTOMATIC BYPASS SWITCH FOR SIGNAL CONDUCTOR

[75] Inventors: Pavel Bren; William V. Mallette, both of Rochester, N.Y.

[73] Assignee: Time Warner Entertainment Co. L.P., Stamford, Conn.

[21] Appl. No.: 724,911

[22] Filed: Oct. 2, 1996

[51] Int. Cl.[6] .............................. H04M 3/42; H01H 31/02
[52] U.S. Cl. ............................... 379/26; 379/27; 379/32; 370/249; 324/543; 361/93
[58] Field of Search ..................................... 379/1, 2, 5, 6, 379/22, 24, 26, 27, 29, 30, 32, 34; 324/509, 537, 543, 555, 556; 361/15–17, 42, 92, 93, 95; 370/241, 242, 243, 244, 254, 247, 248, 251

[56] References Cited

U.S. PATENT DOCUMENTS

| | | |
|---|---|---|
| 4,862,491 | 8/1989 | La Salle et al. ............................ 379/29 |
| 4,935,315 | 6/1990 | Herrin ....................................... 429/50 |
| 5,206,775 | 4/1993 | Wilson ...................................... 361/15 |
| 5,488,413 | 1/1996 | Elder et al. ............................... 455/5.1 |

*Primary Examiner*—Paul Loomis
*Attorney, Agent, or Firm*—Homer L. Knearl; Holland & Hart llp

[57] ABSTRACT

A lightweight, portable, low-power automated bypass device for passing a signal between a first point and a second point on an electrical conductor when an electrical discontinuity exists thereon. The bypass device has two terminals for connection to the electrical conductor, and a continuity detector and a controllable switch. The continuity detector detects a continuous electrical connection between the points along the conductor and supplies a bypass control signal indicating when a discontinuity between the points is detected. The switch is connected to the first and second input terminals and responds to the bypass control signal for providing an electrical connection between the terminals. The bypass device can cycle between an ON time interval and an OFF time interval.

15 Claims, 6 Drawing Sheets

ABYPASS SWITCH FOR SIGNAL
CONDUCTOR

BACKGROUND OF THE INVENTION

1. Field of the Invention

The present invention relates to switches for automatically bypassing a discontinuous portion of a conductor, cable, or wire. More specifically, the present invention relates to an automatic bypass device which detects a discontinuity or interruption in a signal conductor and provides a continuous signal path in substitution thereof.

2. Description of Related Art

In signal transmission or communication networks, signals can be distributed throughout the network by the use of hard-wired conductors, wires, cables, or transmission lines. These conductors provide electrical conductivity between two or more points for transmission of an electrical signal between a source and a destination.

In complex networks involving the distribution of a signal to numerous points within the network, such as in a telephone system or a cable network, the network is generally comprised of miles of signal conductors along with routing components, such as splitters, directional couplers, and terminators. As with any electrical component, these network components, as well as the signal conductors, require periodic servicing to repair identified problems or to upgrade the performance of the network. These changes may involve replacing an existing portion of the signal conductor, or replacing/repairing a component located along the signal conductor.

In servicing either the signal conductor or components located along the conductor, it is desirable to minimize the amount of network downtime so that customers and users of the network are minimally affected.

Figure 1:
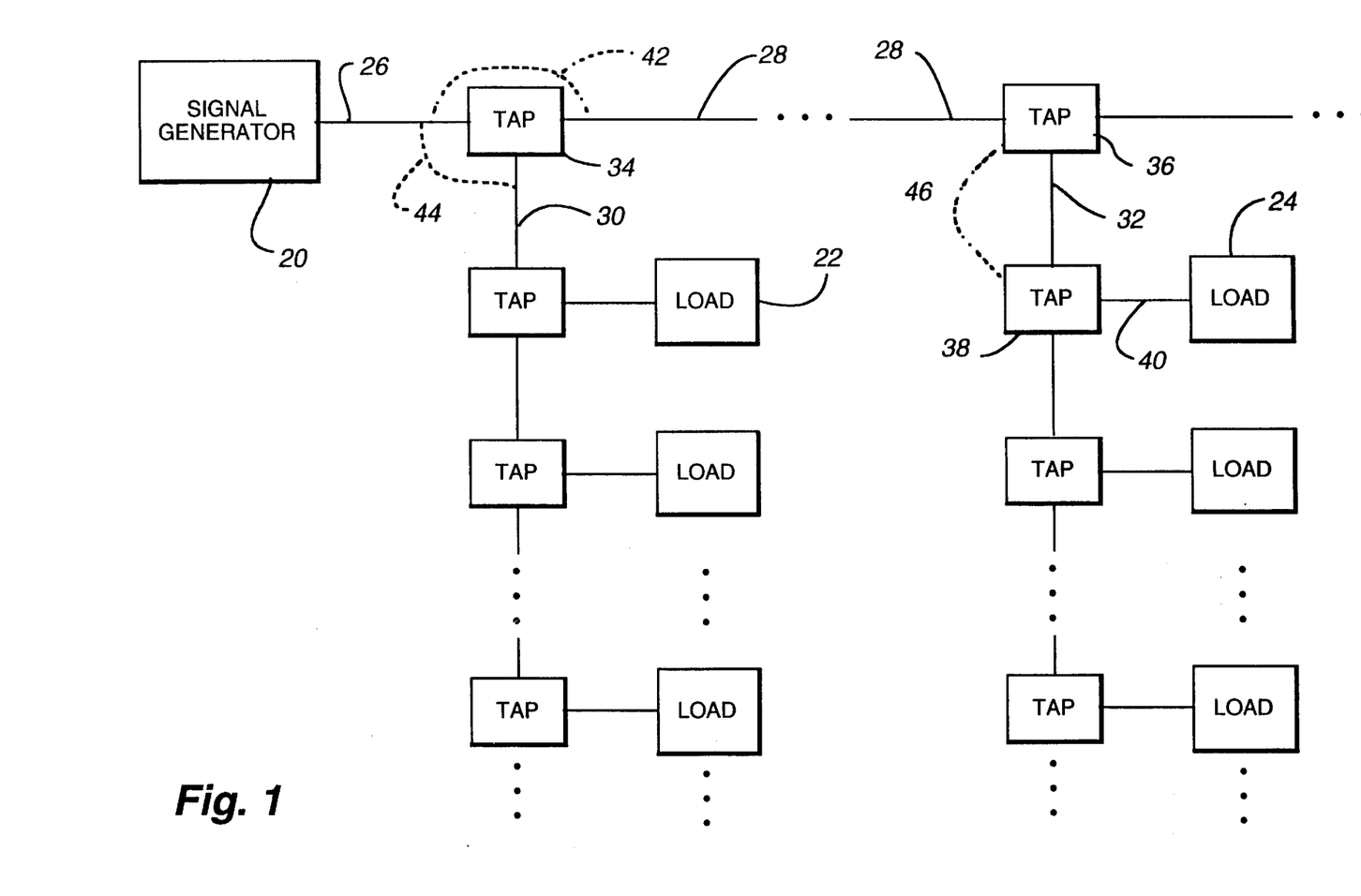
FIG. 1 is a block diagram of an example of a network topology having a signal generator, transmission lines, network components, and loads.

FIG. 1 illustrates an example of a network topology for distribution of a signal from signal generator 20 to a plurality of loads. For instance, signal generator 20 passes a signal to load 24 through signal conductor 26, tap 34, conductor 28, tap 36, conductor 32, tap 38, and conductor 40.

Depending upon the relative position in the network of a conductor or network component, the number of users or loads potentially affected by the removal of a piece of cable or component varies. For instance, if tap 34 becomes inoperative, then the users along both line 30 (including load 22) and line 28 (including load 24) are affected. If, however, conductor 32 becomes inoperative, then only the loads connected thereto are affected, including load 24.

If tap 34 would need to be bypassed for replacement or temporary servicing, tap 34 would conventionally be disconnected from lines 26, 28, and 30. When these lines are disconnected, service is interrupted until either tap 34 is repaired or replaced and reconnected to lines 26, 28, and 30; or until jumper cables 42 and 44 are used to bypass the tap 34.

Similarly, if transmission line 32 requires servicing, then a conventional jumper cable 46 can be bridged between taps 36 and 38 so that the loads (i.e., load 24) continue to receive a signal.

While jumper cables 42, 44, and 46 can provide temporary signal transmission to the loads during servicing of a signal conductor or a network component, these jumper connections have numerous disadvantages associated with their use. First, in networks using transmission lines having a characteristic impedance (i.e., such as in a cable system having a characteristic impedance of 75 ohms) the impedance of the jumper cable can adversely affect the signal quality due to the well known problems of standing waves. A standing wave will be reflected if there is an impedance mismatch between the jumper cable and the characteristic line impedance. The resulting transmitted signal can become attenuated or the phase of the transmitted signal can unpredictably shift, thereby adversely affecting signal quality.

Furthermore, the installation of the jumper cables within the network can be logistically problematic. If, in replacing an already working piece of cable or network component, a service technician connects a jumper across the working device, then the characteristic impedance of the system will be altered due to the parallel combination of the available signal paths. In order to avoid this problem, the technician would be required to disconnect the component under repair immediately after connecting the jumper to restore the line impedance to the impedance of the jumper cable.

Additionally, if the signal conductor or related component to be repaired is located in an area which is difficult to reach (i.e., such as a telephone line on a telephone pole), then it is beneficial to reduce the number of operations which the service technician must perform so as so maximize safety. It is also beneficial to reduce the size and weight of any bypass device for the same reasons.

What is needed is an automated, small, lightweight device to allow repair, servicing, or upgrading of the signal conductor or components contained thereon, while simultaneously maintaining service to the customer. The device should be capable of maintaining the approximate characteristic impedance of the signal conductor in the network.

SUMMARY OF THE INVENTION

In accordance with this invention, the above problems have been solved by the lightweight, portable, and low-power automated bypass device of the present invention. The bypass device passes a signal between a first point and a second point on an electrical conductor when an electrical discontinuity exists. The bypass device is a two-terminal device having a continuity detector and a switch. The first input terminal connected to the first point on the conductor, and a second input terminal connected to the second point on the conductor. The continuity detector is connected between the first and second input terminals for detecting a continuous electrical connection between the first and second points along the conductor. The continuity detector supplies a bypass control signal indicating when a discontinuity between the first and second points is detected. The switch is connected to the first and second input terminals and responds to the bypass control signal for providing an electrical connection between the first and second input terminals.

The switch can be made of a main switch and a controlling switch. The main switch is connected to the first and second input terminals for providing an electrical connection therebetween. The controlling switch cyclically activates the main switch between an ON time interval and an OFF time interval responsive to the bypass control signal, where the OFF time interval is of short duration and is substantially transparent to a user of the signal passed by the main switch.

The controlling switch can be made of an energy storing element and a relay. The energy storing element controls the time duration of the ON time interval and the OFF time interval. The first relay has its winding connected to the energy storage device, and at least one contact for connecting its first input to its second input when the winding is energized. The first input is connected to a positive reference signal and the second input is connected to the main switch for activation thereof.

The main switch can further comprise a second relay having a main winding connected to the second input of the first relay, and at least one contact for connecting the first and second input terminals for providing an electrical connection therebetween.

The continuity detector of the present invention can be made of a transistor element having a base, an emitter, and a collector. The base is connected to the first input terminal, the collector is connected to the switch for providing the bypass control signal thereto, and the emitter is connected to a ground reference voltage and to the second input terminal. When continuity exists between the first and second input terminals, the base of the transistor is connected to the ground reference voltage, thereby deactivating the bypass control signal to the switch. Conversely when a discontinuity exists between the first and second input terminals, the base of the transistor is not connected to the ground reference voltage, thereby activating the bypass control signal to the switch.

The bypass device can also have a bypass mode indictor, a user switch, and a standby mode indicator. The bypass mode indicator indicates when the switch is closed, while the user switch selectively supplies a power signal to the continuity detector, the switch, and the bypass mode indicator. The standby mode indicator indicates when the user switch is activated. The power signal of the inventive bypass device can be derived from a lightweight battery power source.

Furthermore, a method is presented by the present invention for automatically passing a signal between a first point and a second point on an electrical conductor when an electrical discontinuity arises thereon between the first and second points. A continuity detector is connected between the first and second points for detecting a continuous electrical connection between the first and second points along the conductor. A switch is connected to the first and second points for controllably providing an electrical connection therebetween. In the continuity detector, the electrical discontinuity between the first and second points is detected, and a bypass control signal is supplied from the continuity detector indicating that an electrical discontinuity exists between the first and second points.

In the switch, the bypass control signal is received from the continuity detector, and the switch is closed in response to the state of the bypass control signal, thereby proving an electrical connection between the first and second points when a discontinuity exists therebetween.

The great utility of the invention is to allow repair, servicing, or upgrading of a signal conductor or a component located thereon while simultaneously maintaining a conductive signal path so that service to the user of the network is substantially uninterrupted. By the use of the bypass device of the present invention, network downtime during servicing can be substantially reduced.

Another utility of the invention is that the bypass device is fully automated thereby reducing the burdens imposed upon service technicians in the field. The bypass device detects a discontinuity in the signal conductor, and automatically provides a bypass signal path in substitution thereof. After the signal conductor has been repaired, the bypass device then automatically detects the re-establishment of continuity along the signal conductor, and disconnects the bypass signal path.

Yet another utility of the present invention is the portable, light-weight construction and low power consumption of the bypass device.

Still another utility of the present invention is that the user of the bypass device is provided with feedback of both the standby mode and the bypass mode of the bypass device.

Still another utility of the present invention is that the bypass device substantially maintains the characteristic line impedance of the signal conductor network in which the bypass device is utilized.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

The present invention is a bypass device for connection between at least two points along a signal conductor. The bypass device has a continuity detector for automatically detecting an interruption of continuity along the signal conductor between the two points, and a switch for providing an electrical connection therebetween. The bypass device has both a standby mode, wherein the continuity detector is initiated and the bypass device is non-conductive, and a bypass mode wherein the bypass device provides an internal continuous bypass signal path between the two points through the switch. The bypass device further detects the re-establishment of continuity along the signal conductor and automatically disconnects the internal bypass path.

Figure 2:
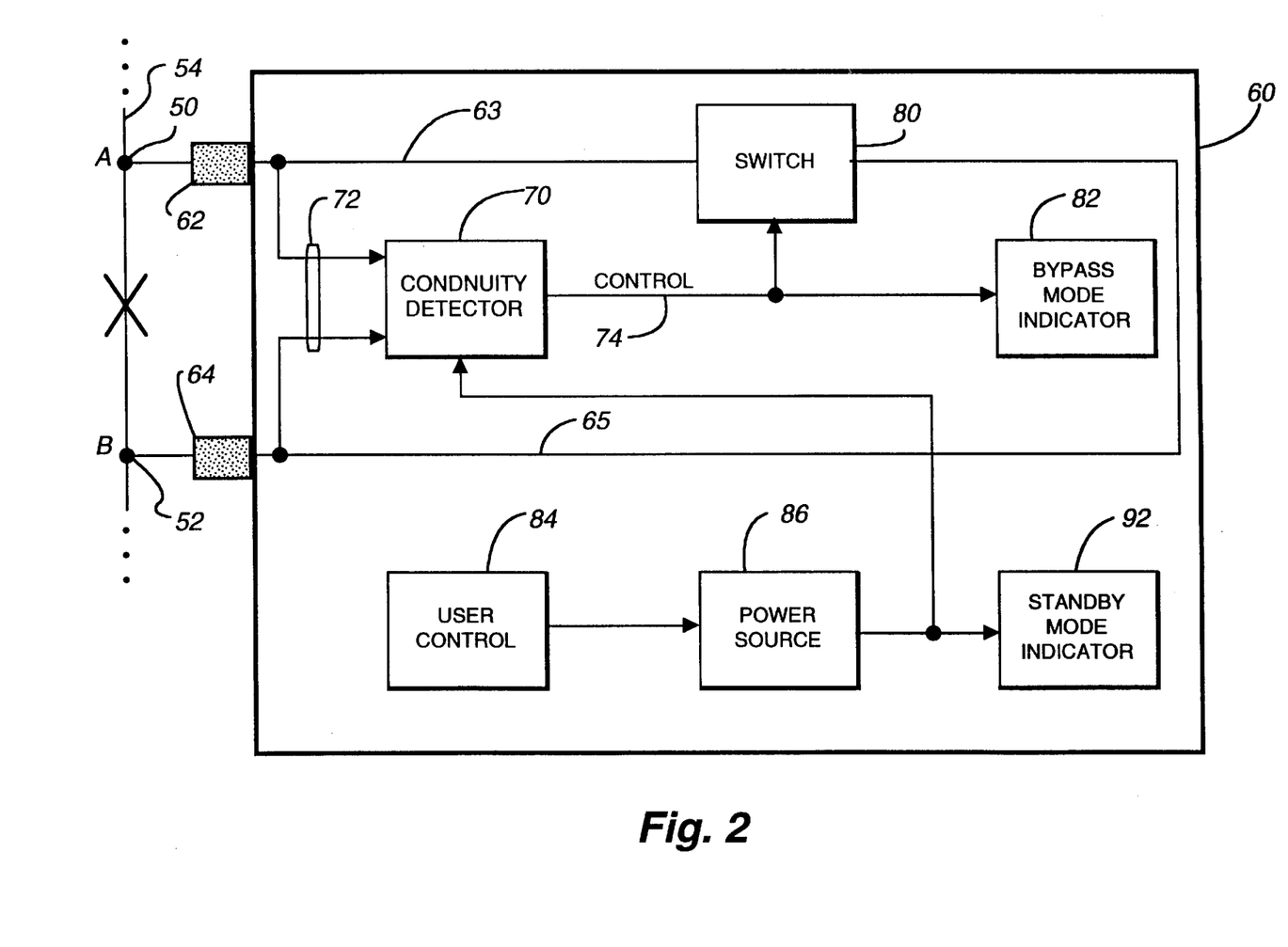
FIG. 2 is a block diagram of a bypass device in accordance with a preferred embodiment of the present invention.

FIG. 2 illustrates a block diagram of the bypass device 60 in accordance with a preferred embodiment of the present invention. Bypass device 60 is connected to nodes or connection points 50 and 52 (labeled "A" and "B") along signal conductor 54. Assuming signal conductor 54 is electrically continuous between nodes 50 and 52, the signal flows along conductor 54 from node 50 to node 52, as bypass device 60 will act as essentially an open circuit under this condition.

Bypass device 60 will act as a short circuit when an interruption or discontinuity develops between points 50 and 52 on signal conductor 54. In accordance with the present invention and as will be described below, bypass device 60 detects this discontinuity and accordingly provides an electrically continuous signal path between points 50 and 52 so that the signal can continue to flow without substantial interruption.

Terminals 62 and 64 of bypass device 60 are connected at nodes 50 and 52 along signal conductor 54. The signals passed through terminals 62 and 64 are internally routed within bypass device 60 as described below.

As previously mentioned, bypass device 60 has a continuity detector 70 and a switch 80. Continuity detector 70 has inputs 72 and a bypass control output signal 74. Continuity detector 70 detects a discontinuity between the inputs 72 and activates bypass control output 74. As illustrated in FIG. 2, the inputs 72 of continuity detector 70 are coupled within bypass device 60 to terminals 62 and 64. Therefore, when a discontinuity between nodes 50 and 52 on signal conductor 54 exists, continuity detector 70 asserts bypass control signal 74.

Switch 80 has input line 63 coupled to terminal 62 and input line 65 coupled to input terminal 64. Switch 80 generally opens or closes based on the state of the bypass control signal 74, and provides a bypass connection between input lines 63 and 65.

When continuity detector 70 asserts bypass control signal 74, switch 80 closes, thereby providing a continuous signal path through switch 80 between the conductors coupled to terminals 62 and 64. When bypass control signal 74 is not asserted, switch 80 opens and disconnects the bypass connection between the two input lines 63 and 65.

Bypass device 60 also has a user control 84 for enabling or disabling power source 86. Power source 86 provides power to the electrical components contained within bypass device 60, such as continuity detector 70 and standby mode indicator 92, as will be explained below.

Bypass device 60 has a standby mode and a bypass mode. Standby mode is initiated by the user through user control 84. Standby mode provides standby power to the electronic components contained within bypass device 60 and activates continuity detector 70 for detection of a discontinuity between connecting points 50 and 52. As indicated in FIG. 2, standby mode indicator 92 provides an indication that the bypass device 60 is properly powered by power source 86, indicating that bypass device 60 is ready for use.

Bypass mode of the present invention is initiated after standby mode has been enabled and a discontinuity in the signal conductor 54 has been detected. Bypass control line 74 from continuity detector 70 is coupled to a bypass mode indicator 82. Bypass mode indicator 82 provides an indication to the user of bypass device 60 that a discontinuity in signal conductor 54 has been detected by continuity detector 70, and that bypass device 60 is presently providing a conductive signal path in substitution thereof. In bypass mode, the bypass device checks the status of the continuity of the external signal conductor 54 so that when the continuity is re-established, bypass device 60 automatically disables the bypass signal path.

Figure 3:
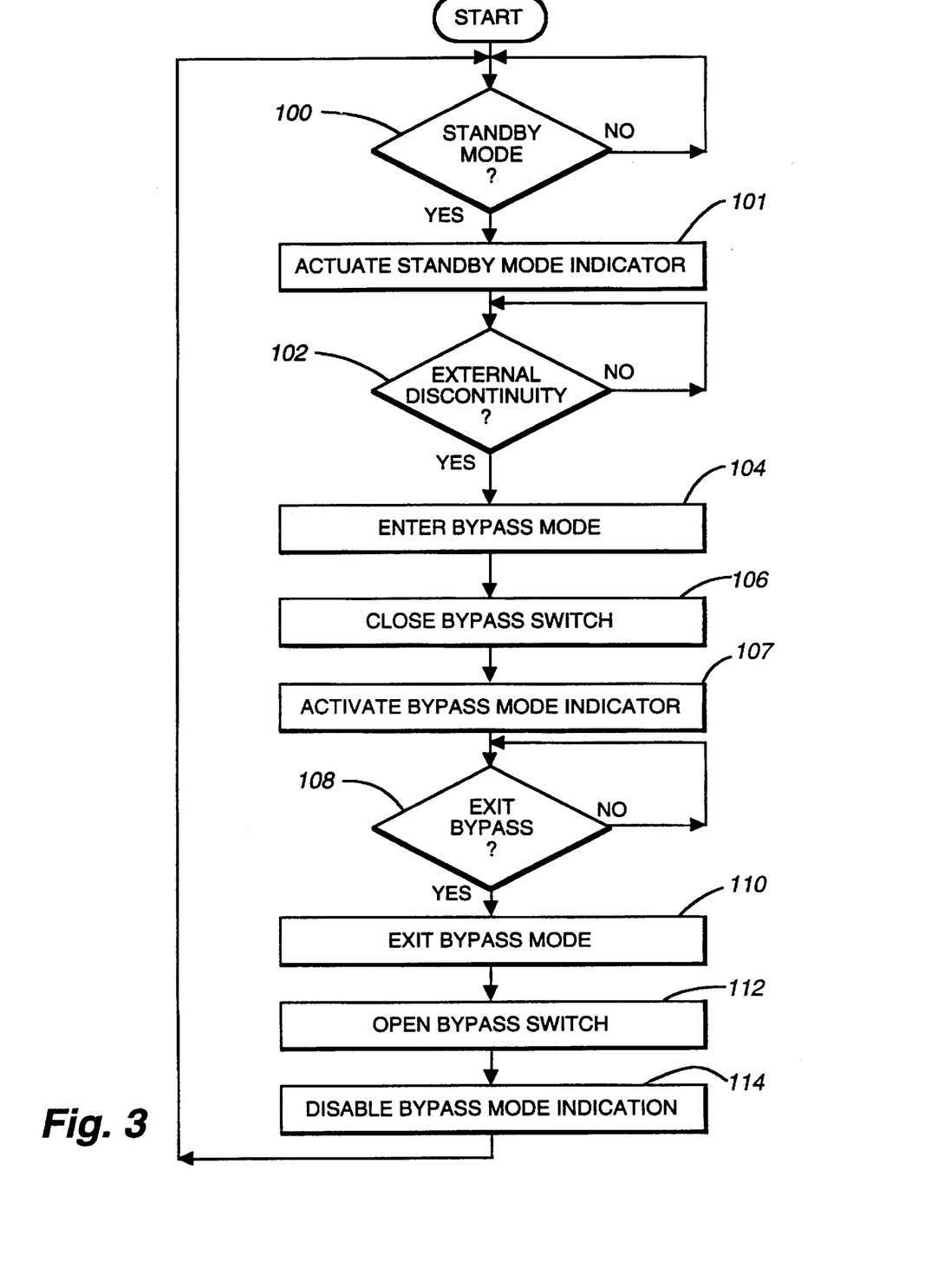
FIG. 3 illustrates the logical operations performed by the bypass device 60 of FIG. 2.

FIG. 3 illustrates the logical operations performed by bypass device 60. The illustrated operations assume that the bypass device has been connected across and in parallel with a signal conductor or component located thereon.

Decision operation 100 determines if the bypass device has been placed in standby mode. Standby mode operation 101 applies standby power to the components of the bypass device, activates the discontinuity detector, and activates the standby mode indicator.

If the bypass device is in standby mode, then detection operation 102 tests whether an external signal discontinuity exists along the signal conductor connected between the input terminals of the bypass device. If an external discontinuity is detected, then the initiation operation 103 initiates a cycle and the bypass device enters bypass mode at operation 104. Accordingly, operation 106 closes the bypass switch of the bypass device to provide an internal continuous signal path between the input terminals of the bypass device. The bypass mode indicator is also activated at operation 107, as explained above.

Detection operation 108 determines if the bypass mode should be exited (i.e., if continuity along conductor 54 has been re-established). If so, operation 110 exits the bypass mode, operation 112 opens the bypass switch previously closed by operation 106, and operation 114 disables the bypass mode indicator. Control is then passed to operation 100 for repetition of the process.

Figure 4:
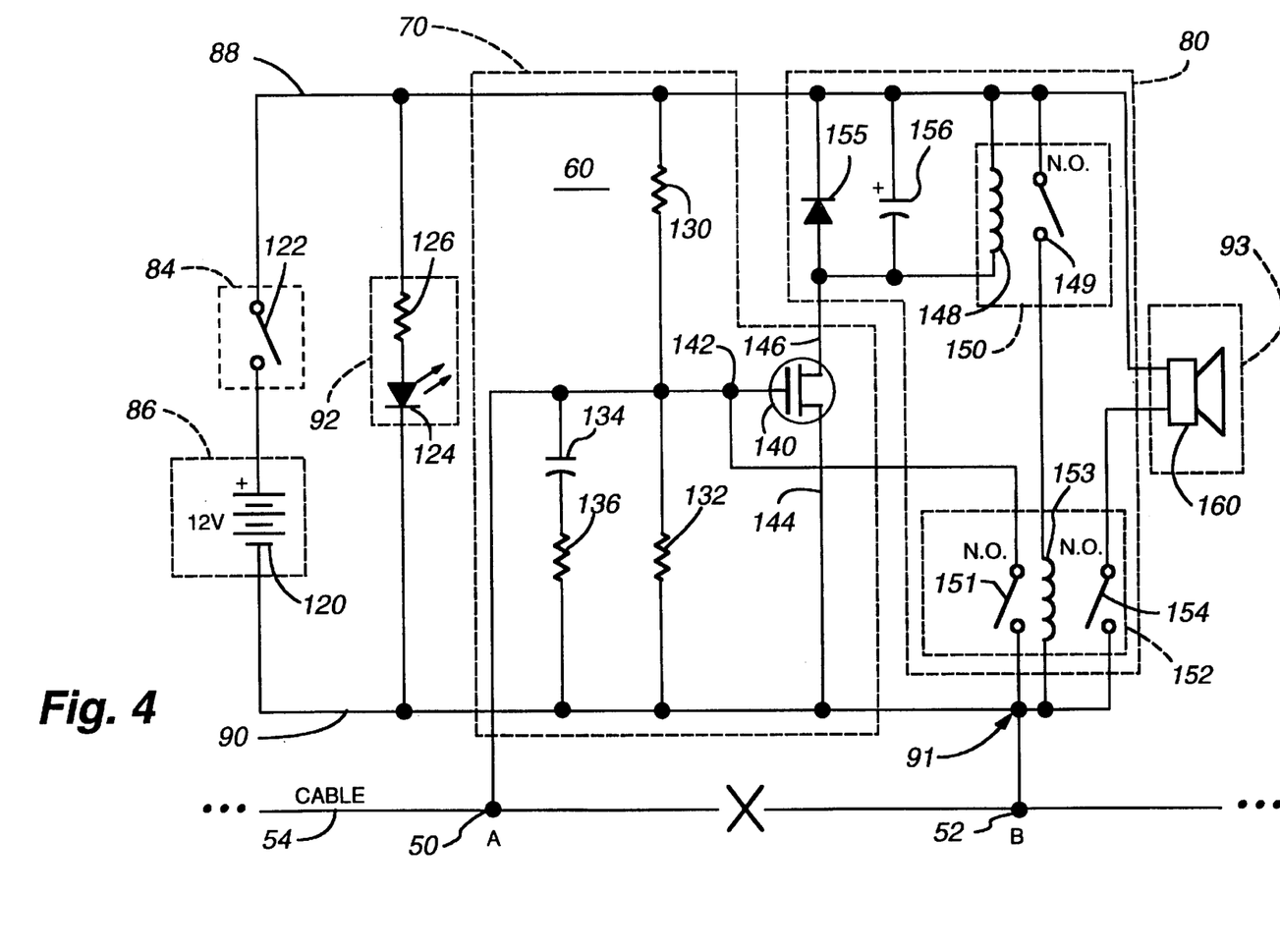
FIG. 4 is a circuit diagram of a preferred embodiment of the bypass device of the present invention.

FIG. 4 illustrates a second preferred embodiment of the present invention, wherein the embodiments described in FIGS. 2 and 3 are implemented using discrete electrical components.

As shown in FIG. 4, power supply 86 (FIG. 2) is provided by a 12 volt DC battery 120. User control 84 (FIG. 2) is implemented with user switch 122, which when closed by the user, places the bypass device 60 in standby mode by providing a 12 volt DC power voltage between line 88 and DC ground reference line 90. The series combination of resistor 126 and light emitting diode (LED) 124 provide the standby mode indication previously described.

The continuity detector 70 of FIG. 2 is implemented using a switching element 140, shown as a transistor element, and a network of components as shown in FIG. 4. The transistor 140 has a base 142, an emitter 144, and a collector 146. While switching element 140 has been described as a transistor, it is understood that a similar switching element such as a field effect transistor (FET) or the like could be used in replacement thereof. Use of a FET as element 140 would be advantageous due to the small base current characteristics of FETs, which would help extend the life of battery 120.

The base 142 of the transistor 140 is biased through a voltage divider formed by resistors 130 and 132. If resistors 130 and 132 are of equal value, then the voltage at the base of transistor 140 will have a steady-state voltage of approximately one-half of the supply voltage.

Further, capacitor 134 in series with resistor 136 provides filter network at the base of transistor 140 to stabilize the base voltage from noise fluctuations. The base of transistor 140 is also connected to one of the input terminals of bypass device 60, as well as to the first contact 151 of normally open relay 152, explained below.

The switch 80 of FIG. 2 is implemented in FIG. 4 as a pair of normally open relays 150 and 152, and a latching/timing circuit connected to the collector 146 of transistor 140.

Relay 150 is a normally opened relay having its coil 148 connected between the 12 volt supply line 88 and the collector 146 of transistor 140. The contact 149 of relay 150 is connected between supply line 88 and coil 153 of relay 152. A latch and timing circuit, composed of diode 155 and a capacitor 156, is connected in parallel to the coil 148 of relay 150 so as to latch the voltage developed across the coil of the relay when the relay is energized, thereby maintaining the relay 150 in a closed position after energizing.

Relay 152 is a two-contact relay where both contacts are normally open. The first contact 151 of relay 152 is connected between the base 142 of transistor 140 (which is also connected to point 50 of conductor 54) and point 52 along conductor 54 through DC ground reference 90 at node 91. The second contact 152 of relay 152 connects buzzer 160 to negative side or voltage reference 90 of battery 120 to activate the bypass mode indicator 93.

The switching contact 149 of relay 150 is connected between the 12 volt power signal line 88 and the coil 153 of relay 152, so that relay 152 is energized only upon energizing relay 150. In this manner, relay 150 is a controlling switch which controls the state of relay 152. Relay 152 is a main switch which provides the signal bypass path between points 50 and 52.

Depending on the application, relay 152 can be selected to have high current and/or high voltage ratings so that the signal present on conductor 54 will not be adversely affected when passed through relay 152 of bypass device 60. In contrast, relay 150 can have a low current and low voltage rating, and accordingly can be of substantially smaller component size.

Having described the interconnection of the components of FIG. 4, the operation of the circuit will now be described in detail. The operation of the circuit of FIG. 4 is described assuming that switch 122 has been closed by the user, thereby placing the circuit in standby mode, and that a continuous signal conductor 54 initially exists between connecting points 50 and 52.

Once the circuit is in standby mode and a placed across a continuous conductor, transistor 140 is "off". Transistor 140 is off because emitter 144 of transistor 140 is connected to DC voltage reference 90, and the base 142 of transistor 140 is connected, at node 91, to DC voltage reference 90 through conductor 54 between connecting points 50 and 52. Hence, there is no voltage from the base 142 to emitter 144 of transistor 140 as long as there is no voltage difference between connecting points 50 and 52 on cable 54, and the transistor 140 is off.

Upon a discontinuity arising between points 50 and 52 on conductor 54 (i.e., due to a break in the conductor or the disconnection of a network device connected therebetween), the voltage at the base 142 of transistor 140 increases to approximately half of the supply voltage (assuming resistors 130 and 132 are equal in value), thereby turning transistor 140 "on".

Once the base 142 of transistor 140 has reached the voltage level required to turn transistor 140 on, transistor 140 then conducts current from its collector 146 to its emitter 144 connected to voltage reference 90. Hence, the coil 148 of relay 150 is energized, and its normally opened contact closes.

When transistor 140 is on, capacitor 156 also charges to approximately the full supply voltage. Diode 155 and capacitor 156 clamp the voltage developed across the coil of relay 150 so that the relay is securely energized.

Relay 150, being energized and closed, energizes relay 152, and both contacts 151 and 154 of relay 152 then close. Since the first contact 151 of relay 152 connects point 50 to point 52 of the signal conductor 54, a continuous signal path is internally provided by the bypass device through relay 152. Simultaneously, the bypass mode indicator 93 (i.e., buzzer 160) is activated through the second contact of relay 152.

Relay 152 is chosen to have an input impedance (when the contacts are closed) approximately equal to the characteristic line impedance of the signal conductors in which bypass device 60 is being utilized. For instance, in a cable system, the characteristic impedance of the cable transmission lines is 75 ohms. Accordingly, a relay having an impedance of 100 ohms (when the contacts are closed) has been found to substantially minimize the negative effects of traveling wave reflection.

Any delay between the occurrence of the discontinuity from points 50 and 52 and the closure of relay 152 can be reduced by the proper selection of the value of capacitor 134 and resistors 130, 132, and 136. Using the RC circuit elements 134 and 136 with transistor 140 provides deterministic, reliable, and consistent switching times due to the switching characteristics of transistor 140.

The circuit of FIG. 4 also has an additional "cycling" affect. During bypass operations, the controlling switch (relay 150) and the main switch (relay 152) cycle between an "on" time interval and a momentary "off" time interval. As previously described, once the signal conductor between points 50 and 52 is interrupted, transistor 140 turns on which applies a voltage across capacitor 156 and the coil 148 of relay 150. Therefore, relay 150 becomes energized and capacitor 156 charges to approximately the supply voltage. The charge developed across capacitor 156 is sufficient to maintain relay 150 energized even after transistor 140 turns off. It has been found that if capacitor 156 is an electrolytic capacitor of approximately 100,000 micro-farads, then capacitor 156 can alone maintain relay 150 energized for approximately 12 to 15 seconds.

When relay 150 is energized, relay 152 is subsequently closed which connects point 50 to point 52 through the first contact 151 of relay 152. Since the first contact 151 of relay 152 is also connected between the base 142 of transistor 140 and voltage reference 90, closure of the first contact 151 of relay 152 connects the base 142 to voltage reference 90 at node 91. This turns off transistor 140. Transistor 140 will remain off—through the connection of the base 142 to voltage reference 90 at node 91—as long as relay 152 is energized or the connection between points 50 and 52 is discontinuous.

Since transistor 140 is off, the relay 150 would also tend to become de-energized. However, the clamping/timing circuit formed by capacitor 156 and diode 155 maintains an energizing voltage across the relay 150, thereby maintaining relay 152 energized and providing a signal bypass through relay 152.

When the charge is capacitor 156 depletes to a level where relay 150 becomes de-energized, the contact 149 of relay 150 opens which de-energizes relay 152 and opens its contacts momentarily. If the signal conductor is still discontinuous between points 50 and 52, then the voltage at the base 142 of transistor 140 again rises to a level governed by the voltage divider formed by resistors 130 and 132. Transistor 140 then turns "on" again, which energizes relay 150, charges capacitor 156, and closes relay 152 which turns off transistor 140. The energy stored in capacitor 156 maintains relay 150 energized for another cycle.

This cycle will repeat until a continuous signal path is re-established between points 50 and 52 on signal conductor 54. After capacitor 156 has discharged and relay 152 is opened at the end of the cycle, if a continuous signal path exists between points 50 and 52 on signal conductor 54, then the transistor 140 will remain off because the base 142 is connected to voltage reference 90 through the signal conductor 54 at node 91. If a discontinuity between points 50 and 52 again develops, the bypass device would begin the above-described cycle with the activation of transistor 140.

The time period of the cycle is generally governed by the amount of charge developed in capacitor 156 while transistor 140 is on, as well as the rate of discharge of capacitor 156 in the circuit. It has been found that a 100,000 micro-Farad capacitor can maintain relay 150 energized for approximately 12 to 15 seconds.

Hence, the circuit of FIG. 4 has achieved the continuity detection and the bypass switching functions previously described. Once the user has connected the bypass device across a signal conductor and placed the bypass device in standby mode, the operation of the bypass device is fully automated. The bypass device will automatically detect a discontinuity in the conductor, provide a continuous signal path in substitution thereof, check for a subsequent re-establishment of continuity in the signal conductor and correspondingly disable the bypass switch. Visual and audio feedback are optionally provided to the user of the bypass device to indicate when the device has been placed in standby mode, and when the bypass device is in bypass mode. All of these features of the present invention are provided within a small, portable unit.

Figure 5A:
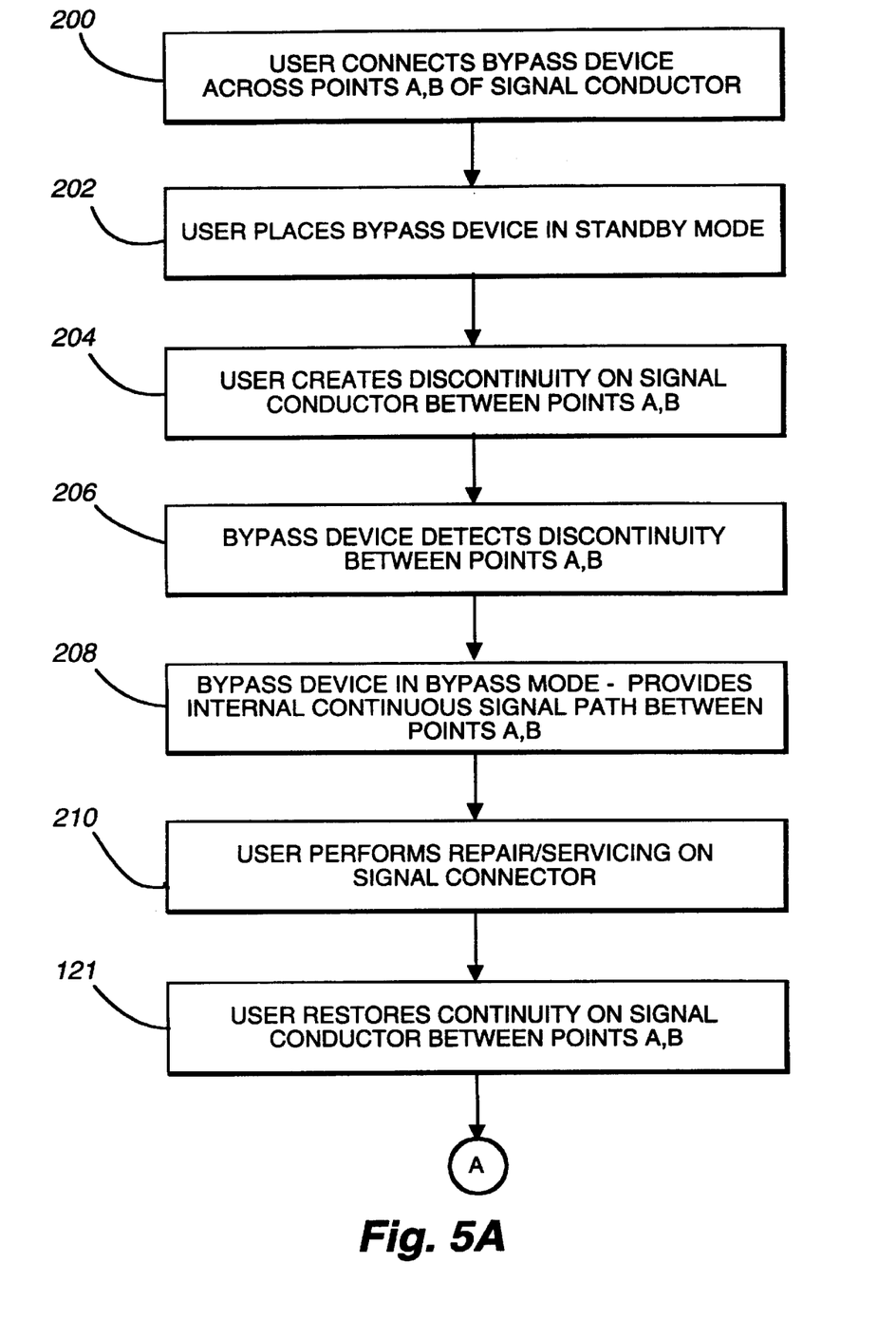
FIGS. 5A through 5B illustrate the logical operations for use of the bypass device of the present invention for servicing or repairing a signal conductor or component located thereon in a network.
Figure 5B:
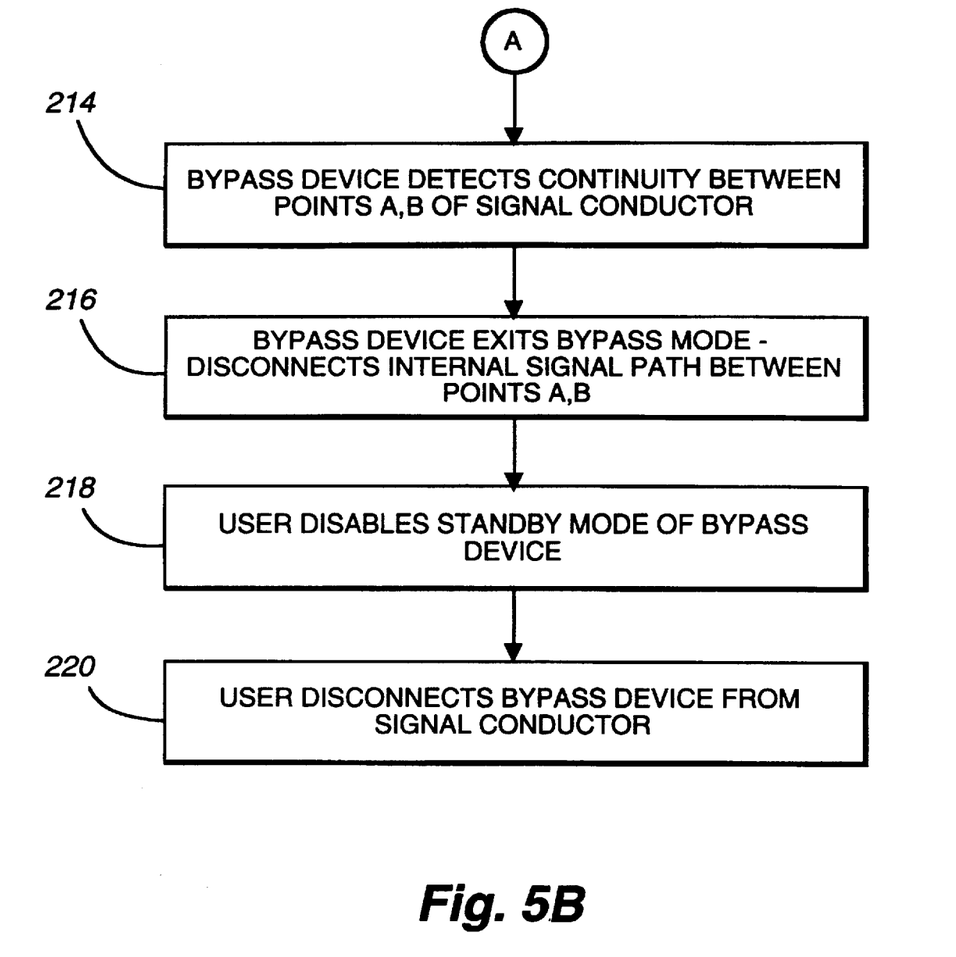

FIGS. 5A and 5B illustrate the steps for use of the bypass device of the present invention in servicing a signal conductor or component located on a signal conductor. At step 200, a user connects the bypass device of the present invention across two points (i.e., A and B) of a signal conductor. At step 202, a user places the bypass device in standby mode by activating the user control described above.

At step 204, the user then creates a discontinuity on the signal conductor between the two points connected to the bypass device. This discontinuity can be created by, for instance, breaking or disconnecting the signal connector, or disconnecting the device about which the bypass device has been connected.

At step 206, the bypass device detects the discontinuity or interruption in the signal conductor between the two points, as described above. At step 208, the bypass device enters bypass mode by providing a continuous signal path between the two points internally within the bypass device.

At step 210, the user can then perform the necessary repair, servicing, or replacement of the signal conductor or the component located thereon. Once the user has completed the repair or servicing along the signal conductor, at step 212 the user restores continuity between the two points along the signal conductor by reconnecting the conductor or the device located thereon.

At step 214, the bypass device detects the reestablishment of continuity between the two points along the signal conductor. At step 216, the bypass device exits bypass mode by disconnecting the internal signal path provided between the two points within the bypass device.

When the user has completed use of the bypass device, then, at step 218, the user disables standby mode of the bypass device through the user control. And, at step 220, the user disconnects the bypass device from the signal conductor.

When used in this manner, the bypass device of the present invention can be used to service a signal conductor without substantial interruption to the signal provided to the recipients of the signals within the network.

While the invention has been particularly shown and described with reference to a preferred embodiment thereof, it will be understood by those skilled in the art that various other changes in the form and details may be made therein without departing from the spirit and scope of the invention.

What is claimed is:

1. Detecting apparatus providing secondary electrical continuity between first and second physically spaced points on an electrical conductor that normally provides primary electrical continuity between said first and second points, said detecting responsive to interruption of said primary electrical continuity, said apparatus comprising:

a first input terminal connected to said first point;

a second input terminal connected to said second point;

said first and second input terminals being normally connected by said primary electrical continuity;

a continuity detector having a first input connected to said first input terminal and having a second input connected to said second input terminal;

said continuity detector being responsive to interruption of said primary electrical continuity;

said continuity detector operating to generate a bypass control signal upon detecting said interruption of said primary electrical continuity;

a first normally open switch;

a second normally open switch connected, when closed, to provide said secondary electrical continuity;

circuit means connecting said bypass control signal in controlling relation to said first normally open switch so as to close said first normally open switch upon said continuity detector detecting interruption of said primary electrical continuity; and circuit means connecting said first normally open switch in controlling relation to said second normally open switch so as to close said second normally open switch upon said closing of said first normally open switch.

2. Apparatus for passing a signal between a first point and a second point on an electrical conductor when an electrical discontinuity exists between said first and second points, said apparatus comprising:

a first input terminal connected to said first point on the conductor;

a second input terminal connected to said second point on the conductor;

a continuity detector connected between said first and second input terminals for detecting a continuous electrical connection between said first and second points along the conductor, said continuity detector supplying a bypass control signal indicating when a discontinuity is detected between said first and second points along the conductor; and a switch connected to said first and second input terminals and responsive to said bypass control signal for providing an electrical connection between said first and second input terminals, said switch comprising;

a main switch connected to said first and second input terminals for providing an electrical connection therebetween; and a controlling switch for cyclically activating said main switch between an ON time interval and an OFF time interval responsive to said bypass control signal, said OFF time interval being of short duration and substantially transparent to a user of a signal passed by said main switch.

3. The apparatus of claim 2, wherein the controlling switch further comprises:

an energy storing element for controlling the time duration of said ON time interval and said OFF time interval; and a first relay having a winding connected to said energy storage device, and at least one contact for connecting a first input to a second input when said winding is energized, said first input connected to a positive reference signal, said second input connected to said main switch for activation thereof.

4. The apparatus of claim 3 wherein the main switch further comprises a second relay having a main winding connected to said second input of said first relay, and at least one contact for connecting said first and second input terminals for providing an electrical connection therebetween.

5. Apparatus for passing a signal between a first point and a second point on an electrical conductor when an electrical discontinuity exists between said first and second points, said apparatus comprising:

a first input terminal connected to said first point on the conductor;

a second input terminal connected to said second point on the conductor;

a continuity detector connected between said first and second input terminals for detecting a continuous electrical connection between said first and second points along the conductor, said continuity detector supplying a bypass control signal indicating when a discontinuity is detected between said first and second points along the conductor;

a switch connected to said first and second input terminals and responsive to said bypass control signal for providing an electrical connection between said first and second input terminals; and said continuity detector comprising a transistor element having a base, an emitter, and a collector, said base connected to said first input terminal, said collector connected to said switch for providing said bypass control signal thereto, and said emitter connected to a ground reference voltage and to said second input terminal, so that when continuity exists between said first and second input terminals along the conductor, said base of the transistor is connected to the ground reference voltage, thereby deactivating said bypass control signal to said switch, and conversely when a discontinuity exists between said first and second input terminals along the conductor, said base of the transistor is not connected to the ground reference voltage, thereby activating said bypass control signal.

6. The apparatus of claim 5, further comprising:

a bypass mode indicator for indicating when said switch is closed.

7. Apparatus for passing a signal between a first point and a second point on an electrical conductor when an electrical discontinuity exists thereon between said first and second points, said apparatus comprising:

a first input terminal connected to said first point on the conductor;

a second input terminal connected to said second point on the conductor;

a continuity detector connected between said first and second input terminals for detecting a continuous electrical connection between said first and second points along the conductor, said continuity detector supplying a bypass control signal indicating when a discontinuity is detected between said first and second points along the conductor;

a switch connected to said first and second input terminals and responsive to said bypass control signal for providing an electrical connection between said first and second input terminals;

a bypass mode indicator for indicating when said switch provides said electrical connection between said first and second input terminals; and a user switch for selectively supplying a power signal for said continuity detector, said switch, and said bypass mode indicator.

8. The apparatus of claim 7, further comprising:

a standby mode indicator for indicating when said user switch is activated.

9. The apparatus of claim 7, wherein said power signal is derived from a battery power source.

10. The apparatus of claim 2, wherein said main switch has an impedance, when said main switch is closed, substantially equal to a characteristic line impedance of said electrical conductor.

11. The apparatus of claim 2, wherein said main switch has an impedance, when said main switch is closed, substantially equal to a characteristic line impedance of said electrical conductor when said electrical conductor is a coaxial cable.

12. The apparatus of claim 2, wherein said main switch has an impedance, when said main switch is closed, of substantially 75 ohms.

13. The apparatus of claim 2, wherein said main switch has an impedance, when said main switch is closed, substantially equal to a characteristic line impedance of said electrical conductor when said electrical conductor is a coaxial cable carrying telephonic services.

14. A method for automatically passing a signal between a first point and a second point on an electrical conductor when an electrical discontinuity arises thereon between said first and second points, the method comprising the steps of:

connecting a continuity detector between said first and second points for detecting a continuous electrical connection between said first and second points along said conductor;

providing a controllable normally open switch connected to said first and second points for controllably providing an electrical connection therebetween;

detecting in said continuity detector said electrical discontinuity between said first and second points along said conductor;

supplying a bypass control signal from said continuity detector indicating that said electrical discontinuity exists between said first and second points along said conductor;

receiving in said switch said bypass control signal from said continuity detector;

closing said switch in response to a state of said bypass control signal indicating that said electrical discontinuity exists between said first and second points along said conductor, thereby proving an electrical connection between said first and second points when said discontinuity exists; and providing for cyclic activation of said switch between a closed state and an open state, said open state being of a short time duration.

15. Apparatus providing a secondary electrical continuity path between first and second physically spaced points on an electrical conductor that normally provides a primary electrical continuity path between said first and second points, said apparatus being responsive to interruption of said primary electrical continuity path, said apparatus comprising:

a continuity detector having a first input connected to said first point and having a second input connected to said second point;

said first and second inputs normally being short circuited by said primary electrical continuity path;

said continuity detector being responsive to interruption of said primary electrical continuity path;

said continuity detector operating to generate a bypass control signal upon detecting interruption of said primary electrical continuity path;

a normally open switch connected, when closed, to provide said secondary electrical continuity path as a short circuit between said first and second points; and circuit means connecting said bypass control signal in controlling relation to said normally open switch so as to close said normally open switch upon said continuity detector detecting interruption of said primary electrical continuity path.

* * * * *